(12) United States Patent
Usui et al.

(10) Patent No.: US 7,703,388 B2
(45) Date of Patent: Apr. 27, 2010

(54) FRYER

(75) Inventors: Rie Usui, Tokyo (JP); Takao Kimura, Tokyo (JP); Kunio Shibasaki, Tokyo (JP)

(73) Assignee: Mermaid Co., Ltd., Tokyo (JP)

( * ) Notice: Subject to any disclaimer, the term of this patent is extended or adjusted under 35 U.S.C. 154(b) by 446 days.

(21) Appl. No.: 11/576,411

(22) PCT Filed: Oct. 6, 2005

(86) PCT No.: PCT/JP2005/018562

§ 371 (c)(1),
(2), (4) Date: Mar. 30, 2007

(87) PCT Pub. No.: WO2006/038677

PCT Pub. Date: Apr. 13, 2006

(65) Prior Publication Data

US 2008/0041238 A1 Feb. 21, 2008

(30) Foreign Application Priority Data

Oct. 6, 2004 (JP) ............................. 2004-319848
Sep. 5, 2005 (JP) ............................. 2005-291663

(51) Int. Cl.
*A47J 37/12* (2006.01)
(52) U.S. Cl. ........................................................ 99/408
(58) Field of Classification Search .................. 99/407, 99/408
See application file for complete search history.

(56) References Cited

U.S. PATENT DOCUMENTS 3,827,985 A * 8/1974 Haan et al .................... 210/179
4,580,549 A    4/1986 Sato
4,603,622 A * 8/1986 Beck ............................ 99/331
4,608,160 A * 8/1986 Zoch ........................... 210/114

(Continued)

FOREIGN PATENT DOCUMENTS

EP          0 682 903 A1    11/1995

(Continued)

OTHER PUBLICATIONS

European Search Report dated Feb. 11, 2009, issued in corresponding European Patent Application No. 05790314.

(Continued)

*Primary Examiner*—Henry Yuen
*Assistant Examiner*—Thien Tran
(74) *Attorney, Agent, or Firm*—Westerman, Hattori, Daniels & Adrian, LLP

(57) ABSTRACT

A fryer for business use is provided which can prevent degradation of cooking oil, secure a good cooking environment and improve a work efficiency. To this end, the fryer of this invention comprises: a water tank 32, 82 to store water; an oil tank 9, 51 arranged above the water tank to store the cooking oil in contact with the stored water in the water tank; a heater 13, 52 arranged in an oil layer in the oil tank; and an oil delivery pipe 10, 61 through which to draw the cooking oil in the oil layer by a pump 29, 64 and release it onto a bottom of the water tank 32, 82; wherein the released cooking oil rises through the water layer and flows into a lower part of the oil layer.

5 Claims, 4 Drawing Sheets

U.S. PATENT DOCUMENTS

| | | | | |
|---|---|---|---|---|
| 5,404,799 A | * | 4/1995 | Bivens | 99/408 |
| 5,617,776 A | * | 4/1997 | King et al. | 99/408 |
| 5,632,266 A | * | 5/1997 | Sato | 126/391.1 |
| 6,217,923 B1 | | 4/2001 | Saito | |
| 6,363,840 B1 | * | 4/2002 | Song | 99/408 |

FOREIGN PATENT DOCUMENTS

| | | | |
|---|---|---|---|
| EP | 1 797 802 A1 | | 6/2007 |
| GB | 2262895 | * | 7/1993 |
| JP | 55-20269 Y2 | | 5/1980 |
| JP | 64-852 Y2 | | 1/1989 |
| JP | 01-153122 A | | 6/1989 |
| JP | 1-153122 A | | 6/1989 |
| JP | 3-41620 Y2 | | 9/1991 |
| JP | 2002-291623 A | | 10/2002 |
| WO | 01/13774 A1 | | 3/2001 |

OTHER PUBLICATIONS

International Search Report of PCT/JP2005/018562, date of mailing Dec. 27, 2005.

International Search Report issued on Dec. 27, 2005, in corresponding Application No. PCT/JP2005/018562.

* cited by examiner

FRYER

TECHNICAL FIELD

The present invention relates to a fryer mainly used for business purposes and more particularly to a fryer equipped with a device for automatically removing deep-fried batter balls and an automatic cooking oil cleaning device to keep the cooking oil clean, prevent its degradation and thereby extend its useful life.

BACKGROUND ART

Conventional fryers store a specified amount of cooking oil in an oil tank and heat it with a gas or electric heater. With the cooking oil heated to a set temperature, the fryer stands by and food materials are thrown in for frying. After a predetermined cooking time, the fried food is taken out and put on paper or an oil draining pan to remove excess oil. Now the frying operation is complete.

Therefore, with the conventional fryer the cooking oil remains at high temperatures continuously even when no frying operation is performed.

The conventional fryer cannot easily collect deep-fried batter balls that disperse from food ingredients into the cooking oil during the frying process, colloidal materials drifting away from the food being fried, and impurities including water, smell and fat flowing out of the food material. These unwanted materials that stay long in the cooking oil cause early degradation of the oil and darken its color, which in turn contaminate the food.

Further, since colloidal, floating oil dirt and deep-fried batter balls adhere to food and sidewalls of the oil tank, the oil must be filtered into a separate container every day to let floating substances to settle over time and the interior of the oil tank cleaned every day.

Generally, a range of temperature of the frying cooking oil agrees with a temperature range that accelerates early degradation and oxidation of oil. In the conventional fryer, it is necessary to raise a large quantity of cooking oil to a set temperature in a short time and to prevent its temperature drop during the frying process and, if dropped, recover it to the set temperature in a short time. For this reason, the heater is operated at a temperature higher than the set temperature of the cooking oil. So, the oil in contact with the surface of the heater in particular is subjected to a far higher temperature than the set temperature.

This accelerates degradation and oxidation of the cooking oil, increases oil smoke and evaporation, and rapidly changes the composition of the oil. As a result, the conventional fryer needs to replace the cooking oil frequently, giving rise to a problem of a high economic burden.

In cooking, food materials are often covered with batters or bread crumbs for frying. During frying, a large volume of batter and crumbs comes off the food, disperses into the cooking oil and is heated and carbonized. This in turn darkens the oil and over time degrades its quality. Therefore, to maintain the quality of the cooking oil, deep-fried batter balls and other discharged substances must be removed frequently. However, this removal work is difficult considering the convenience of the frying process and the construction of the fryer.

During the frying process, water in the food is replaced with the cooking oil. A large amount of water and water vapor flows out of the food into the atmosphere and the cooking oil. The water discharged into the atmosphere turns into smoke and, along with the oil, into oil mist, contaminating the interior of the kitchen and equipment. Further, the water released into the cooking oil mixes with the oil over time, contributing to oxidation and degradation of the oil.

The water that did not mix with the cooking oil after being released into the oil remains in a low-temperature oil layer between a lower part of the heater and the bottom of the oil tank. If the fryer is kept in operation for a long period of time, the oil temperature in the low-temperature oil layer increases and the water remaining at the bottom of the oil tank begins to evaporate, moving up from the low-temperature oil layer to a high-temperature cooking oil layer. As it rises, the water is further heated and continues to expand its volume until it is released into the atmosphere from an oil surface. If this process is continued, there is a risk of the oil flowing over the oil tank.

For removing fine particles of the deep-fried batter balls and lipid substances, a means is available by which the cooking oils is drawn out, removed of the deep-fried batter balls floating in the oil as by filter paper and then cleaned by a cleaner as the oil is returned to the tank. With this means, however, the water released into the oil cannot be removed sufficiently. It is also difficult to perform the cleaning each time the fryer is used.

Patent document 1: Japanese Patent Disclosure No. 55-40249

Patent document 2: Japanese Patent Disclosure No. 60-9426

Patent document 3: Japanese Patent Disclosure No. 5-68440

The above-described conventional fryer keeps the cooking oil at an elevated temperature at all times even when not in use, in order to be ready at any time to perform the frying operation. This deteriorates the cooking oil and shortens its life, leading to the frequent replacement of the oil. Furthermore, this mode of operation necessarily consumes heat energy wastefully for many hours.

Many, large and small deep-fried batter balls coming off the food are dispersed in oil layers and are difficult to remove completely with an existing removal net. It is even more difficult to remove them during the frying process. In the case of a gas type fryer, a heater is fixed and the removal net cannot be inserted under the heater. So one possible method may be to use a sucking type cleaner or another method may involve drawing out the cooking oil from under the oil tank onto a container having the removal net therein and removing the unwanted substances. This, however, takes time and is practically impossible as a means to be performed during the frying process. As a result, the deep-fried batter balls are left in the cooking oil for many hours, shortening the life of the oil.

While the food is being fried, smoke, oil mist and water vapor are released from the oil surface in large quantities. Although the volume of their release decreases when foods are not being fried, smoke and oil mist are always rising. A dedicated exhaust device installed above the fryer cannot discharge them sufficiently, leaving smell and possible environmental contaminations.

Deep-fried batter balls coming off the food, colloidal substances flowing out of it and floating in the oil, and water and smell released from the food material are spread widely into the entire oil during cooking. In addition, there are lots of fine particles of these unwanted materials. Therefore they cannot be collected quickly, which in turn shortens the life of the oil, giving rise to an economic problem. As described above, leaving the unwanted deep-fried batter balls in the hot cooking oil for many hours causes smells, smoke and oil mist to adhere to equipment and human body, polluting the environment.

The present invention has been accomplished to overcome the above-described problems and it is an object of this invention to provide a fryer capable of preventing a degradation of cooking oil, securing a good kitchen environment and enhancing a work efficiency.

SUMMARY OF THE INVENTION

The fryer of this invention comprises: a water tank 32, 82 to store water; an oil tank 9, 51 arranged above the water tank to store the cooking oil in contact with the stored water in the water tank; a heater 13, 52 arranged in an oil layer in the oil tank; and an oil delivery pipe 10, 61 through which to draw the cooking oil in the oil layer by a pump 29, 64 and release it onto a bottom of the water tank 32, 82; wherein the released cooking oil rises through the water layer and flows into a lower part of the oil layer.

Here, of the oil layers the oil layer formed above the heater 13, 52 is a high-temperature cooking oil layer and the oil layer formed below the heater 13, 52 is a low-temperature oil layer that has little degradation of oil.

The fryer according to this invention, as shown in FIG. 1, comprises: a water tank 32 to store water; an oil tank 9 installed above the water tank 32 to store cooking oil in contact with the stored water in the water tank 32; a heater 13 arranged in an oil layer in the oil tank; a partition plate 15 arranged in a low-temperature oil layer below the heater 13 to receive impurities, such as deep-fried batter balls, falling down the cooking oil; and an oil delivery pipe 10 through which to draw the cooking oil above the partition plate along with these impurities by a pump 29 and release it onto a bottom of the water tank 32; wherein the released cooking oil rises through the water layer and flows into a lower part of the oil layer.

The fryer according to this invention has a pipe 25 installed between the oil tank 9 and the water tank 32 and extending to evade the partition plate 15 to communicate oil layers above and below the partition plate 15.

The fryer according to this invention has a construction in which a heat exchange pipe 16 installed in an oil layer below the heater 13 is communicated with a heat accumulating unit 22 having its periphery insulated, and in which outer air or air heated by the heat accumulating unit is sent between the heat exchange pipe and the heat accumulating unit by a fan 23 to adjust the temperature of the cooking oil.

In this construction, the heat absorbed by the heat exchange pipe 16 from the cooking oil in the oil layer is stored and maintained at an elevated temperature in the heat accumulating unit 22. When the frying operation is to be performed again, the heater 13, 52 is switched to a high temperature setting and the heat accumulated in the heat accumulating unit 22 is applied to the cooking oil, thereby recovering the cooking oil to a frying temperature in a short time.

Further, when the frying operation is not performed, a changeover switch (not shown) may be operated to switch the temperature setting of the cooking oil to a low temperature. At the same time, outer air is introduced by the fan 23 into the heat exchange pipe 16 installed in the oil layer and then circulated to absorb the heat of the cooking oil, thereby lowering the temperature of the cooking oil layer to a temperature range where the oil is hardly oxidized or degraded.

The fryer according to this invention has an electrostatic dust collecting plate 14 installed in the oil layer which adsorb fine deep-fried batter balls floating in the cooking oil.

The fryer according to this invention has a construction in which a cover 2 put on a top of the oil tank 9 and opened and closed by a hinge 5 has its interior communicated with a lower part of a water layer 20 in a cleaning tank 8; and in which a gas containing smoke, smell and oil mist produced from an oil surface is drawn by a suction fan 6 and passed through the water layer 20 to remove the gas of smell, smoke and oil before being exhausted to the atmosphere through a gas drain pipe 19.

The fryer according to this invention, as shown in FIG. 3 and FIG. 4, has a construction in which a filter water tank 71 having a filter 80 is installed close to the water tank 82; and in which impurities such as deep-fried batter balls are drawn along with water into the filter water tank 71 from a water suction pipe inlet 74 at a bottom of the water tank 82, with the impurities such as deep-fried batter balls left to settle on a bottom of the filter water tank and with water filtered by the filter 80 returned to the water layer from a water supply opening 70 provided in the water tank 82.

In this construction, the deep-fried batter balls, colloidal materials discharged from food, water and smell, all dispersed in the cooking oil during the frying operation, are quickly drawn along with the cooking oil to a water layer in the lowest part of the oil tank and pushed into the water. As a result, the oil is cleaned and cooled in the water as it rises through the water and then reaches the low-temperature oil layer.

The cooking oil therefore is kept at a low temperature at which the oil is hardly degraded. At the same time, the same volume of oil that has been carried into the low-temperature oil layer moves up from the low-temperature oil layer to the cooking oil layer above the oil heating heater 52, where it is heated. So, the time during which the cooking oil remains hot can be shortened, preventing the degradation of oil and maintaining the freshness and clarity of the oil.

The fryer according to this invention has a construction in which a temperature sensor 75 to detect a water temperature in the water tank 82 is installed; and in which a water tank cooling fan 76 to lower the water temperature in the water tank 82 is installed in a lower part of the water tank 82; wherein the temperature sensor and the water tank cooling fan are operated to adjust the water temperature in the water tank 82 and thereby adjust a temperature of the low-temperature oil layer below the heater 52.

The fryer according to this invention has a construction in which a mixing prevention grid 62 made up of vertically arrayed plate pieces is installed near a boundary between a water layer and an oil layer above it to separate the water and oil layers and thereby prevent a mixing of water and cooking oil, which would otherwise be caused by the release of the cooking oil from the oil delivery pipe 61 at the bottom of the water tank 82 and by the release of water from the water supply inlet 70 of the filter water tank 71.

The fryer according to this invention has a construction in which a dispersion plate 68 to scatter around the cooking oil rising through the water layer is installed in a path in which the cooking oil released from the bottom of the water tank 82 rises, so that the cooking oil will not directly rise to the hot cooking oil layer.

The fryer according to this invention has a construction in which, in addition to the heater 52 that operates at an elevated temperature, an auxiliary heater 81 for adjusting a temperature of the heater is connected in series with the heater to work as a low-temperature heater; and in which wherein a cylindrical inner case 78 for preventing contamination of an inner sidewall surface of the oil tank 51 is provided inside the oil tank to cover the inner sidewall surface of the oil tank.

Since the fryer of this invention has a construction in which the oil tank is arranged above the water tank, in which the heater is installed in the oil layer of the oil tank, and in which the cooking oil in the oil layer is drawn by the pump and released onto the bottom of the water tank through the oil delivery pipe, so that the released cooking oil rises through the water layer and flows into a lower part of the oil layer. This construction allows deep-fried batter balls and discharged materials from food, all produced during the frying process, to be forcibly cleaned with water along with the cooking oil. This construction can also secure a low-temperature oil layer. As a result, the degradation of cooking oil can be minimized, reducing the frequency of replacing the cooking oil with new oil, which is economical. Further, the work environment can be protected against contamination, assuring a good cooking environment.

Moreover, in addition to the main heater that operates at an elevated temperature, an auxiliary heater is connected in series with the main heater to adjust the temperature of the main heater. This also produces the effect described above.

In addition to the advantages and effects described above, the fryer of this invention, which has the partition plate arranged in the low-temperature oil layer, also offers an advantage of being able to efficiently collect impurities such as deep-fried batter balls falling down the cooking oil.

The fryer of this invention employs the construction in which air heated by the heat accumulation unit communicating with the heat exchange pipe is introduced or discharged by the fan to adjust the temperature of the cooking oil. This construction allows the temperature of the cooking oil to go down to a low temperature in a short time, preventing degradation of the oil that is standing by for cooking. Further, by applying the heat accumulated in the heat accumulation unit to the cooking oil, the cooking oil can be returned to a high cooking temperature in a short time, facilitating the work and putting the heat to an effective use.

With the fryer of this invention, since the electrostatic dust collecting plate is installed in the oil layer, superfine solid particles are adsorbed by the electrostatic dust collecting plate. The cooking oil cleared of impurities is recirculated into the cooking oil layer. Thus the degradation of cooking oil can be minimized, reducing the frequency of oil replacement, which is economical.

With the fryer of this invention, since the interior of the cover of the oil tank is communicated with the cleaning tank and smoke produced from the oil surface is drawn by the fan and passed through the water layer, the air can be efficiently removed of smoke, smell and oil mist, improving the work environment.

With the fryer of this invention, since the water cooled by the cooling fan installed at the bottom of the water tank is drawn along with impurities such as deep-fried batter balls into the filter water tank, from which the filtered water is returned to the water tank, the time during which the cooking oil is kept at an elevated temperature is shortened, minimizing the degradation of oil, maintaining the clarity and freshness of the cooking oil. There is also an advantage that the water can be filtered in the filter water tank along with the impurities.

With the fryer of this invention, since the mixing prevention grid is installed near a boundary between the water layer and the oil layer, the mixing of water and cooking oil, which would otherwise be caused by the rising cooking oil released from the bottom of the water tank or by the release of water, can be prevented.

With the fryer of this invention, since the dispersion plate to scatter around the cooking oil rising through the water layer is installed in a path in which the cooking oil released from the bottom of the water tank rises, the cooking oil that has passed through the water layer can be prevented from quickly rising through the low-temperature oil layer to the cooking oil layer. This offers an advantage of being able to maintain a good cooking environment for the oil.

DESCRIPTION OF THE PREFERRED EMBODIMENTS

Now, preferred embodiments of the present invention will be described.

Figure 1:
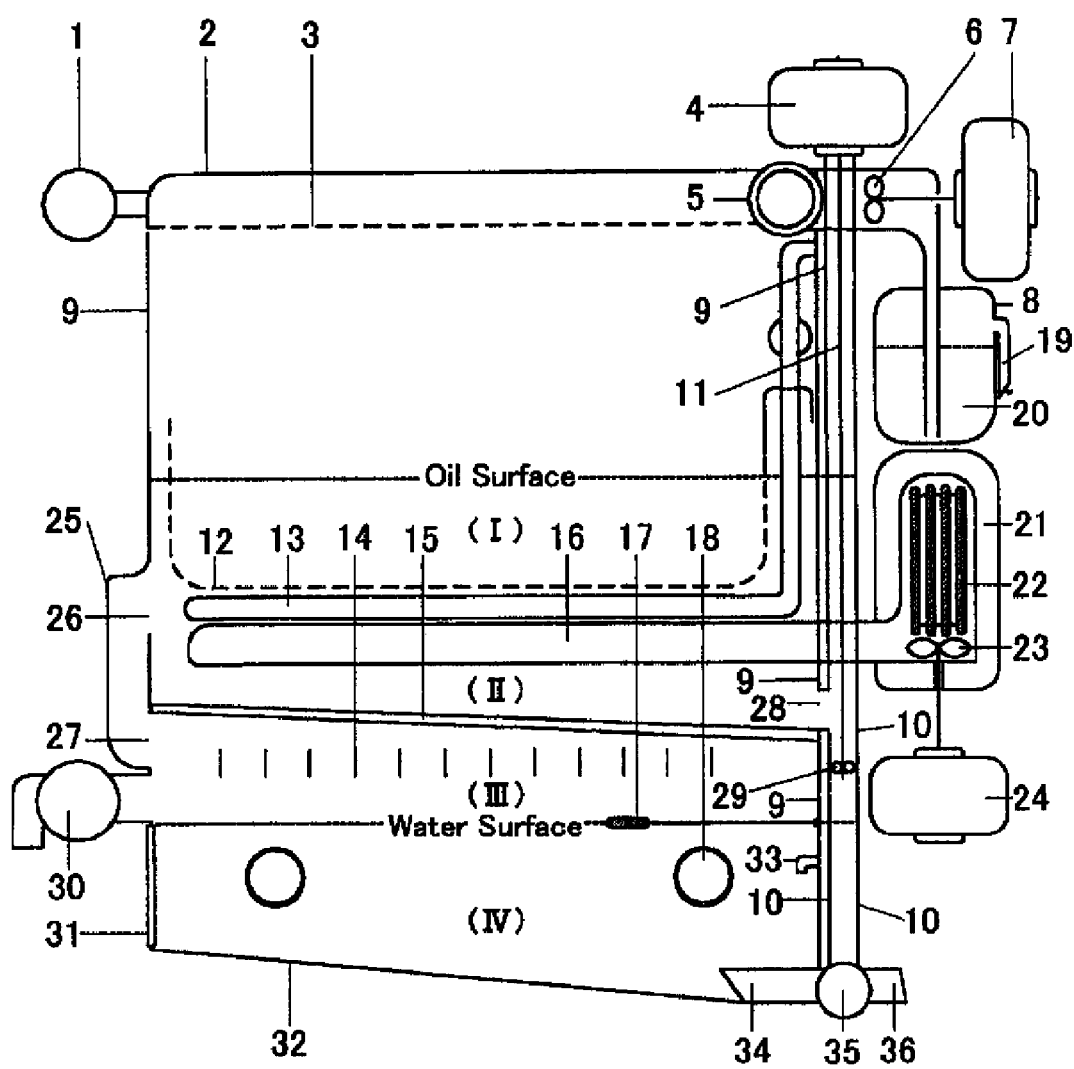
FIG. 1 is a schematic side view of a fryer according to a first embodiment of this invention.
Figure 2:
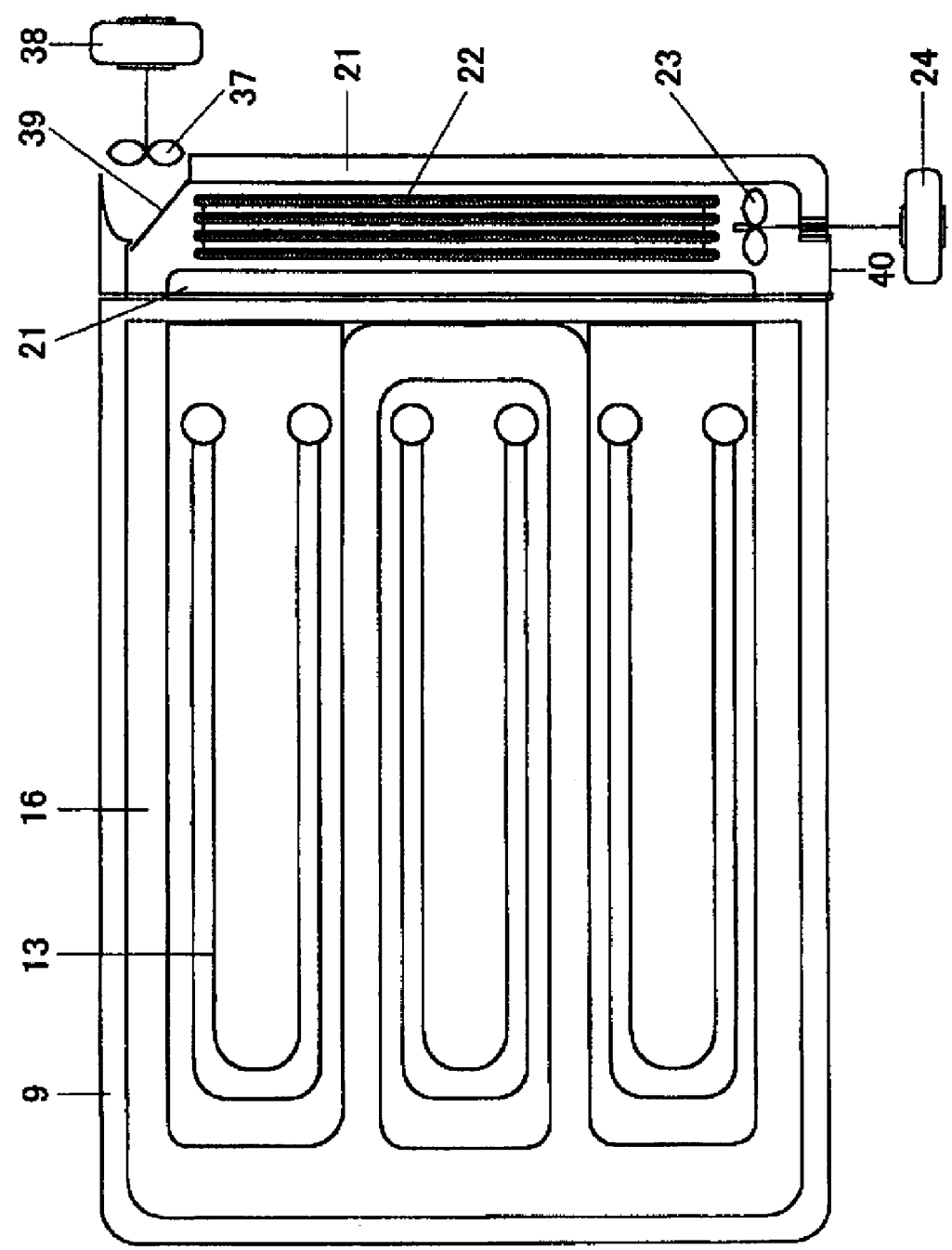
FIG. 2 is a schematic plan view of the fryer according to the first embodiment.

FIG. 1 and FIG. 2 illustrate a fryer according to a first embodiment of this invention. FIG. 1 is an explanatory side view of the fryer. Denoted 9 is an oil tank 9, 32 a water tank 32, and 13 an electric heater 13 to heat cooking oil in the oil tank. In the oil tank 9 there are formed a high-temperature cooking oil layer (I) above the heater 13 and a low-temperature oil layer (II) below the heater 13. Below the low-temperature oil layer (II) is installed a partition plate 15. Below the oil tank 9 is provided the water tank 32. Between a water layer (IV) in this water tank 32 and the partition plate 15 there is formed an oil storage layer (III) to store oil.

A temperature sensor (not shown) is installed in the frying oil layer (I) to maintain the oil temperature. When the oil temperature falls below a set level, the heater 13 is turned on to start heating to keep the oil at the set temperature.

The oil tank 9 is separated by the partition plate 15 arranged slightly tilted in the oil layer below the heater 13. The partition plate 15 receives impurities such as deep-fried batter balls falling down the cooking oil.

The water tank 32 and the oil tank 9 are connected by a pipe 25 having an oil inlet 27 and an oil outlet 26 in a manner that avoids the partition plate 15.

Close to the upper surface of the partition plate 15 there is provided an oil outlet 28, through which the cooking oil including deep-fried batter balls near the upper surface of the partition plate 15 is drawn out by an oil delivery pump 29 driven by a screw pump drive motor 4 installed in an oil delivery pipe 10. The cooking oil thus drawn out from the oil outlet 28 is released through a three-way valve 35 at the lower end of the oil delivery pipe 10 and through an oil supply and discharge pipe 34 out into the bottom of the water tank 32.

The cooking oil released onto the bottom of the water tank 32 floats up the water layer (IV), by its own specific gravity difference, into the oil storage layer (III). At the same time, the water and deep-fried batter balls fall onto the bottom of the water layer (IV), pushing the cooking oil in the oil storage layer (III) to move from the oil inlet 27 and the oil outlet 26 into the cooking oil layer (I).

A heat exchange pipe 16 and a heat accumulating unit 22 constitute a heat accumulate and release device, which is shown in FIG. 2, a plan view.

When the cooking oil temperature falls down to a specified value below the set temperature, as when a large volume of food material is thrown into the fryer and the oil temperature cannot rise only by the heat produced by the heater 13, a fan 23 is operated to circulate heat accumulated in the heat accumulating unit 22 through the heat exchange pipe 16 in the form of hot air to help raise the temperature of the cooking oil in a short time.

If the next frying operation is not performed immediately following the previous one, the oil temperature needs to be lowered as quickly as possible to keep the composition of the oil intact.

For that purpose, the present invention provides a changeover switch (not shown) which is switched to a standby side after the frying operation to form a low-temperature setting circuit to shut off the frying temperature setting circuit, allowing the cooking oil to go down slowly. At the same time, an external air introducing fan 37 for the heat accumulating unit 22 is energized to open a trap door 39, sending the outer air into the heat exchange pipe 16.

The air delivered into the heat exchange pipe 16 is heated by the heat accumulated there by the cooking oil and is carried into the heat accumulating unit 22, from which the heated air is exhausted from a trap door 40, thus realizing a reduction in the oil temperature. The heat taken from the cooking oil is accumulated and stored in the heat accumulating unit 22 enclosed by an insulation layer 21. If necessary, the heat accumulating unit 22 is maintained at a set temperature by a dedicated internal heater (not shown).

When one wants to perform a frying operation, he or she switches the changeover switch from the standby side to the cooking side to put the heater 13 at the high-temperature setting. At the same time, the fan 23 is turned on to deliver the hot air from the heat accumulating unit 22 into the heat exchange pipe 16 to raise the cooking oil to the set temperature in a short time.

Suppose, for example, the heater consumes 3 kW using a three-phase 200 V as a power supply, that the high-temperature cooking oil layer (I) has a volume of 3 liters, and that the sheathed heater has a heat efficiency of 80%. Then, for the cooking oil layer to be heated from the low set temperature of 140° C. to about 170° C. in three minutes and then to reach the initial set temperature of 180° C., it takes four minutes if only the heater is used. At the same time, by adding the heat of the heat accumulating unit 22 to the cooking oil through the heat exchange pipe 16, the initial set temperature can be recovered in two minutes and a half, thus shortening the waiting time.

The amount of deep-fried batter balls deposited at the bottom of the water tank 32 can be checked from a peep window 31 of the water tank. Turning the three-way valve 35 to a discharge side allows the deep-fried batter balls and discharged materials and the water in the water layer to flow down a discharge pipe 36 into drainage through a deep-fried batter ball collector.

Along with the discharged water the cooking oil also flows down. When a water level float 17 lowers, a valve of a water supply nozzle 33 opens, automatically supplying water from the water supply nozzle 33 directly connected to a city water into the water tank 32. After confirming through the peep window 31 that the interior of the water tank is cleaned, an operator closes the three-way valve 35 to stop the discharge. The water from the water supply nozzle 33 automatically stops when the water level float 17 reaches the water level.

In replacing the cooking oil in the oil tank 9, an oil drain valve 30 is opened to allow the entire oil in the high-temperature cooking oil layer (I), the low-temperature oil layer (II) and the oil storage layer (III) to flow into a container. Since the oil drain valve 30 is located above the water level, the water in the water layer (IV) does not flow out along with the oil.

In FIG. 1, a box-shaped cover 2 is supported on the oil tank 9 by a cover hinge 5. Air intake openings 3 are arranged in the entire inner surface of the cover 2. As an air intake fan 6 rotates, smoke, water vapor and oil mist from oil surface are sucked out from the air intake openings 3 and led to the bottom of a water layer 20 of a cleaning tank 8, in which they are cleaned as they rise through the water layer 20 and exhausted from a gas release pipe 19. This operation is performed only when the temperature setting circuit is in operation, in order to suck and clean the smoke, water vapor and oil mist produced during the frying process. This operation is not stopped even when the cover is opened.

As described above, the fryer of this embodiment has a heating device and a heat dissipating device. The heating device comprises the heat accumulating unit and the heat exchange pipe and is capable of raising the cooking oil temperature in a short time to assist the heater. The heat dissipating device introduces an open air directly into the heat exchange pipe to cool the oil in a short time. These two devices combine to limit heat losses during the standby and thereby prevent degradation of the oil.

Further, the fryer of this embodiment has a deodorizing, smoke elimination device that cleans smoke, smell, oil mist and water vapor with water before releasing them into the atmosphere. Therefore, during the frying operation, deep-fried batter balls and other discharged materials are automatically collected at all times and the simple exhaust device eliminates the possibility of smoke, smell and oil mist floating around.

Figure 3:
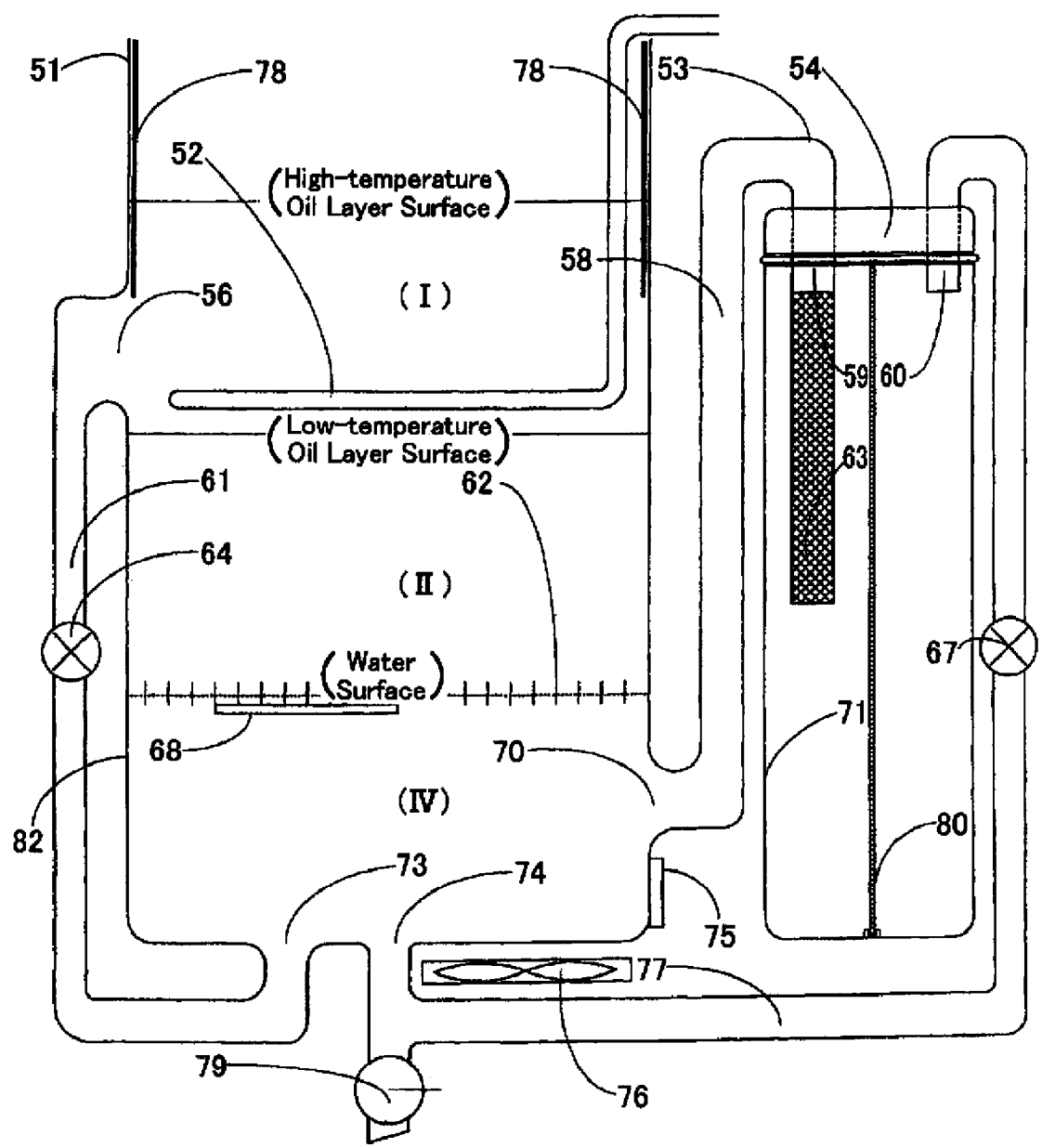
FIG. 3 is a schematic side view of a fryer according to a second embodiment of this invention.
Figure 4:
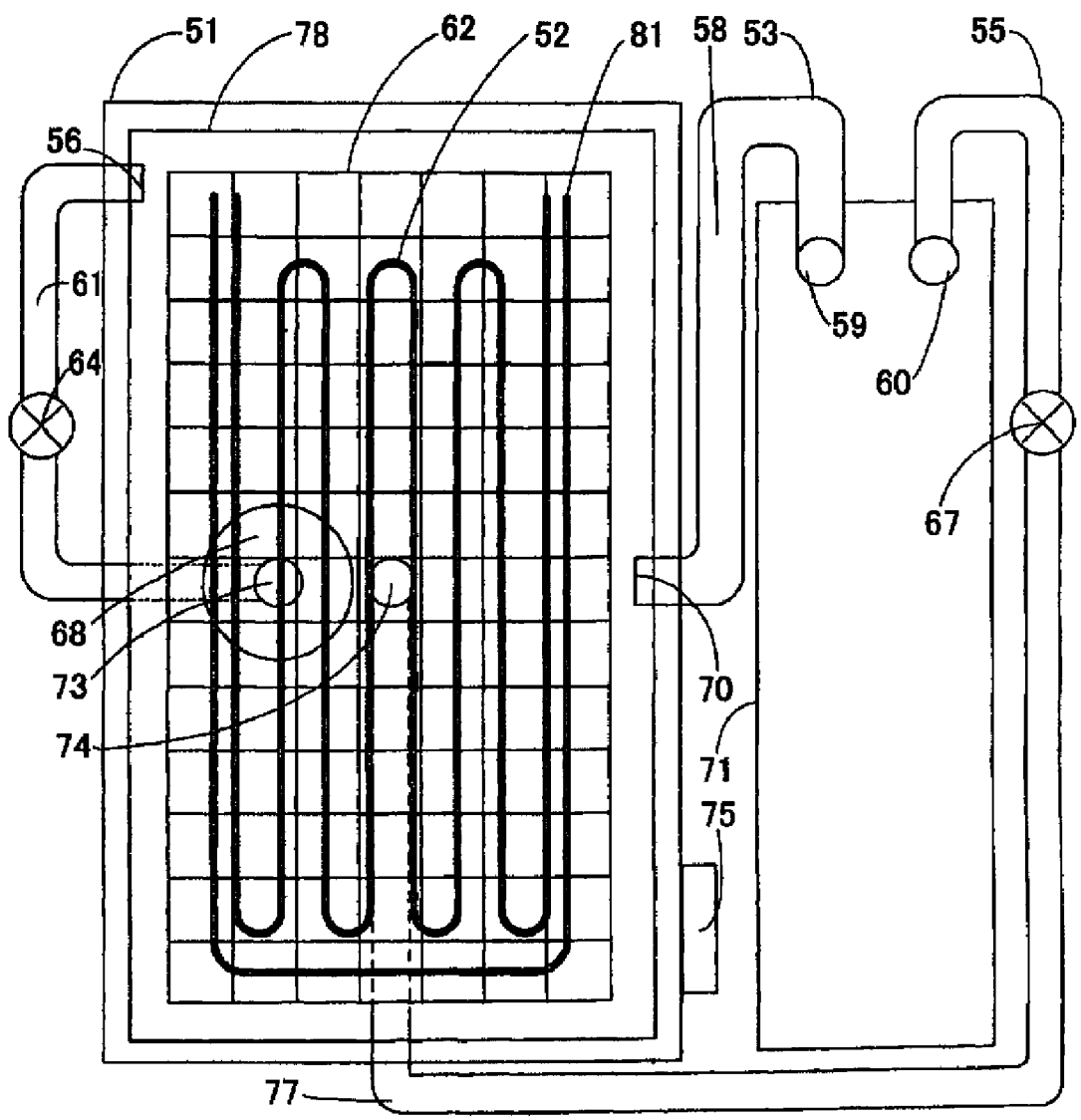
FIG. 4 is a schematic plan view of the fryer according to the second embodiment.

FIG. 3 and FIG. 4 illustrate a fryer according to a second embodiment of this invention. In these figures, elements identical with those of the first embodiment are given like reference numerals.

FIG. 3 is an explanatory side view of the fryer. Denoted 51 is an oil tank, 82 a water tank, and 52 an electric heater to heat the cooking oil in the oil tank. In the oil tank 51 there are a high-temperature cooking oil layer (I) above the heater 52 and a low-temperature oil layer (II) below the heater 52. In the water tank 82 provided below the oil tank 51, a water layer (IV) is formed.

Denoted 64 is a screw-type pump that draws the high-temperature oil along with deep-fried batter balls floating in the oil into an oil transfer pipe 61 from an oil transfer pipe inlet 56 and delivers it from an oil supply opening 73 into the water layer (IV). The oil is separated from the deep-fried batter balls as they rise through the water. The oil is cleaned efficiently in this manner.

If the pump 64 that draws the high-temperature cooking oil layer (I) is operated at high speed, the oil and the water in the oil are mixed, clouding the oil white and degrading the oil quality. It is therefore desirable to operate the pump 64 at a low speed of 400 rpm and to have the screws of the pump arranged at a low pitch.

Designated 79 is a drain valve 79 for draining water and oil and is used to replace the water layer (IV) and the cooking oil. When adding water to maintain the water level after the draining, the water may be poured into the cooking oil layer (I) from the oil surface. For correct water level, it is desirable to have a water level meter.

The drain valve 79 is also used to discard the cooking oil layer (I) and the low-temperature oil layer (II).

A suction pump 67 installed in a water suction pipe 77 opening to the water tank 82 is operated during the frying process and at predetermined times to collect deep-fried batter balls deposited at the bottom of the water layer (IV) and to keep the water layer at a low temperature.

With the suction pump 67 in operation, the water and crumbs carried into a filter water tank 71 are mixed with water already stored there to fill the water tank. Since the cover of the filter water tank is hermetically closed, the pressure within the tank increases causing the water filtered by a filter 80 to be returned to the water layer (IV) from a discharge pipe inlet 59 and a water supply inlet 70.

As described above, this process of drawing water from a water suction pipe inlet 74 and returning it to the filter water tank 71 is repeated to clear the bottom of the water layer and collect the deep-fried batter balls.

In this fryer, the low-temperature oil layer (II) is intended to store the oil of the high-temperature cooking oil layer (I) after having been cleaned at a low temperature for a while. Although the low-temperature oil layer (II) is cooled by the water of the water layer (IV), the upper part of the low-temperature oil layer (II) is connected to the high-temperature cooking oil layer (I) and thus susceptible to an elevated temperature.

Therefore, to keep the temperature of the water layer (IV) constant and minimize an increase in the temperature of the low-temperature oil layer (II), the suction pump 67 is started when a water temperature rises to a set temperature, delivering the water of the water layer to the filter water tank 71 where the water is filtered and mixed with the cooled water before being returned to the water layer. Since the fluid delivered by the pump is water and its temperature is low at 50° C. and since the head of the pump is small, an existing small water pump can be used.

Further, a water tank cooling fan 76 installed at the bottom of the water tank 82 to minimize an increase in temperature of the water in the water tank 82 may be small in size.

The water in the water tank 82 and the water in the filter water tank 71 are replaced during the frying process and according to a predetermined program. When the water in the water tank 82 is supplied to the filter water tank 71, the water rotates in vortex about the water suction pipe inlet 74 as a center. So, there is a possibility of the water in an upper part of the water layer in contact with the low-temperature oil layer (II) getting mixed with oil.

Further, the release of the cooking oil from the oil delivery pipe at the bottom of the water tank or the release of water from the filter water tank can cause the water and the cooking oil to be disturbed and mixed.

To forestall these possibilities, a mixing prevention grid 62 made up of vertically arranged plate pieces for separating water and oil is installed at a boundary between the water layer and the low-temperature oil layer.

The oil drawn from the cooking oil layer (I) is released into the water layer (IV) and cooled as it rises to the low-temperature oil layer (II). At this time, since its temperature is higher than that of the low-temperature oil layer, the oil may rise quickly to the cooking oil layer. To pre-vent this, a dispersion plate 68 for temporarily holding a lump of the cooking oil rising through the water layer and scattering it around is installed directly above the oil supply opening 73, i.e., in a path in which the oil is rising, thereby causing the oil to rise slowly up to the low-temperature oil layer as it is cooled by the water of the water layer.

Considering the fact that the water temperature is below 50° C. and for the purpose of checking the rising oil from above the cooking oil layer, the dispersion plate 68 is preferably made of a transparent polycarbonate.

In addition to the main heater 52 that operates at an elevated temperature, an auxiliary heater 81 is also provided for adjusting the heater temperature. Both of these heaters can be connected in series as required to work as a low-temperature heater.

That is, when raising the oil temperature at an initial stage, the low-temperature heater using the series-connected circuit is activated. This low-temperature heater is operated also to keep the oil at the set temperature to prevent oil degradation.

When a sensor detects a temperature drop of 5° C., as when a frozen food material is thrown in, the high-temperature main heater 52, excluding the series-connected auxiliary heater 81, is activated to rapidly recover the oil temperature to the cooking temperature.

In the oil tank 51 an inner case 78 extending from the upper end of the oil tank down to the lower part of the cooling oil layer (I) is removably installed to cover and prevent the inner sidewall surface of the oil tank 51 from being contaminated.

This inner case 78 can normally protect the inner sidewall surface of the oil tank 51 from being contaminated with oil dirt. It can also be taken out and cleaned, as required, without drawing oil from the tank. This is proven to have the same effect as when the sidewall surface of the oil tank 51 is cleaned in an ordinary way. The inner case 78 need only be formed of a stainless steel plate with a handle.

With the above embodiment, the life of the cooking oil and the period in which the oil remains clean can be prolonged, enhancing economy. At the same time, deep-fried batter balls and materials discharged from the food are automatically drawn and collected by a pump, facilitating the cleaning of the oil. This process allows even fine particles of crumbs, which could not have been collected by the conventional net, to be quickly removed, making the cleaning easy. Except during the cooking, the oil is rested at a low temperature, contributing to a longer life of oil. This in turn allows the use this fryer in such applications where a long hour, continuous operation is essential or in such stores that remain open for many hours. This fryer can be realized in a low-cost construction.

When the frying operation is finished, the suction pump 67 is activated for a predetermined time to continuously draw from the water suction pipe inlet 74 into the filter water tank 71 the deep-fried batter balls that have fallen from the cooking oil layer and are lying on the bottom of the water tank 82 and crumbs and colloidal materials discharged from the food and floating in the water of the water tank 82 after the oil cleaning. So, the interior of the water tank 82 is kept clean at all times.

The conventional deep-fried batter ball collecting net becomes obviated. As for the cleaning operation performed after the business hours, there is no need to draw oil from the tank and filter it. The only process required includes removing the contamination prevention inner case 78 and cleaning it of adhering dirt, thus shortening the time it takes to clean the oil tank. Further, the two oil heaters can be used: one is a high-temperature main heater to deal with a sudden drop of oil temperature during the frying operation; and the other is an auxiliary heater connected in series with the main heater to work as a low-temperature heater during the normal operation. These two heaters are automatically switched to keep the oil temperature constant as practically as possible. The fryer of this construction can prolong the life of the oil.

The invention claimed is:

1. A fryer comprising:
   a water tank to store water;
   an oil tank installed above the water tank to store cooking oil in contact with the stored water in the water tank;
   a heater arranged in an oil layer in the oil tank;
   a partition plate arranged in a low-temperature oil layer below the heater to receive impurities, such as deep-fried batter balls, falling down the cooking oil;

an oil delivery pipe through which to draw the cooking oil including deep-fried batter balls near the upper surface of the partition plate by a pump and release it onto a bottom of the water tank; and a pipe installed between the oil tank and the water tank and extending to evade the partition plate to communicate oil layers above and below the partition plate;

wherein the released cooking oil rises through the water layer and flows into a lower part of the oil layer.

2. A fryer according to claim 1, further comprising a heat exchange pipe installed in an oil layer below the heater is communicated with a heat accumulating unit having its periphery insulated;

wherein outer air or air heated by the heat accumulating unit is sent between the heat exchange pipe and the heat accumulating unit by a fan to adjust the temperature of the cooking oil.

3. A fryer according to claim 1, further comprising an electrostatic dust collecting plate to absorb fine deep-fried batter balls floating in the cooking oil is installed in the oil layer.

4. A fryer according to claim 1, further comprising a cover put on a top of the oil tank and opened and closed by a hinge has its interior communicated with a lower part of a water layer in a cleaning tank;

wherein a gas containing smoke, smell and oil mist produced from an oil surface is drawn by a suction fan and passed through the water layer to remove the gas of smell, smoke and oil before being exhausted to the atmosphere through a gas drain pipe.

5. A fryer according to claim 1, further comprising a temperature sensor to detect a water temperature in the water tank is installed;

a water tank cooling fan to lower the water temperature in the water tank is installed in a lower part of the water tank;

wherein the temperature sensor and the water tank cooling fan are operated to adjust the water temperature in the water tank and thereby adjust a temperature of the low-temperature oil layer below the heater.

\* \* \* \* \*